(12) United States Patent
Martin et al.

(10) Patent No.: US 12,698,013 B2
(45) Date of Patent: Aug. 4, 2026

(54) SINGLE-BASEBOARD VEHICLE

(71) Applicant: SpeedInnov, Paris (FR)

(72) Inventors: David Jérôme Martin, Sainte Soulle (FR); Christophe Landreaud, Les Essards (FR); Michel Lepetit, Saint Pierre d'Amilly (FR); Olivier Sanson, La Rochelle (FR); Alexandre Bernard, Chatelaillon-plage (FR); Fabien Bondu, Rochefort (FR)

( * ) Notice: Subject to any disclaimer, the term of this patent is extended or adjusted under 35 U.S.C. 154(b) by 470 days.

(21) Appl. No.: 18/492,147

(22) Filed: Oct. 23, 2023

(65) Prior Publication Data

US 2024/0132121 A1 Apr. 25, 2024
US 2024/0227877 A9 Jul. 11, 2024

(30) Foreign Application Priority Data

Oct. 24, 2022 (FR) ..................................... 22 10989

(51) Int. Cl.
*B61D 1/04* (2006.01)
*B61D 17/18* (2006.01)
(Continued)

(52) U.S. Cl.
CPC .............. *B61D 1/04* (2013.01); *B61D 17/18* (2013.01); *B61D 33/0007* (2013.01);
(Continued)

(58) Field of Classification Search
CPC .......... B60N 2/242; B60N 2/015; B60N 2/01; B60N 2/005; B61D 1/04; B61D 17/08;
(Continued)

(56) References Cited

U.S. PATENT DOCUMENTS 2,925,050 A * 2/1960 Candlin, Jr. ........... B61D 17/12
244/119
9,221,542 B2 * 12/2015 Imbert ............... B64D 11/0624
(Continued)

FOREIGN PATENT DOCUMENTS

EP 0787636 B1 3/2001
EP 2716547 A2 4/2014
(Continued)

OTHER PUBLICATIONS

French Search Report issued in French Patent Application No. 22 10989, dated Apr. 25, 2023 in 2 pages.

*Primary Examiner* — Zachary L Kuhfuss
(74) *Attorney, Agent, or Firm* — Knobbe, Martens, Olson & Bear, LLP

(57) ABSTRACT

A single-baseboard vehicle (10) that includes a first row (18) of seats (16), a second row (20) of seats (16), cables (36) extending between the lateral feet (28) of the seats (16), first baseboards (40), each first baseboard (40) extending between the lateral feet (28) of two of the seats (16) of each first row (18) and supporting the cables (36), and second baseboards (42), each second baseboard (42) extending between the lateral feet (28) of two of the seats (16) of each second row (20) and supporting the cables (36). The first baseboards (40) and the second baseboards (42) have identical lengths (L), each first baseboard (40) and/or each second baseboard (42) comprises, on at least one end (44), a portion covered (46) by one of the lateral feet (28) between which the first baseboard (40) and/or the second baseboard (42) is arranged.

10 Claims, 3 Drawing Sheets

(51) Int. Cl.
    B61D 33/00           (2006.01)
    B61D 49/00           (2006.01)
    *B60N 2/01*            (2006.01)
    *B60N 2/24*            (2006.01)
    *B60R 16/02*          (2006.01)

(52) U.S. Cl.
    CPC ......... B61D 33/0064 (2013.01); B61D 49/00
          (2013.01); *B60N 2/01* (2013.01); *B60N 2/242*
                  (2013.01); *B60R 16/0215* (2013.01)

(58) Field of Classification Search
    CPC ........................... B61D 17/18; B61D 33/0064;
                         B61D 33/0007; B61D 1/06
    See application file for complete search history.

(56)               References Cited

U.S. PATENT DOCUMENTS

| | | | |
|---|---|---|---|
| 10,992,120 B2 * | 4/2021 | Kreiger | B64D 11/0624 |
| 11,362,494 B2 * | 6/2022 | Kreiger | H02G 3/0425 |
| 2021/0006051 A1 | 1/2021 | Kreiger et al. | |

FOREIGN PATENT DOCUMENTS

| | | | |
|---|---|---|---|
| EP | 3363737 A1 | 8/2018 | |
| EP | 3656607 A1 | 5/2020 | |
| WO | 2017/198716 A1 | 11/2017 | |

* cited by examiner

SINGLE-BASEBOARD VEHICLE

CROSS-REFERENCE TO RELATED APPLICATION

This application claims priority to French Patent Application No. 22 10989 filed on Oct. 24, 2022, the disclosure of which including the specification, the drawings, and the claims is hereby incorporated by reference in its entirety.

FIELD OF THE INVENTION

The present invention relates to a vehicle comprising:
at least one first row of seats successively aligned along a first wall of the vehicle, the seats of each first row being separated from each other by a first constant separation distance,
at least one second row of seats successively aligned along a second wall of the vehicle, the seats of each second row being separated from each other by a second constant separation distance, the second separation distance being strictly smaller than the first separation distance,
each seat of each first row and each second row comprising a respective lateral foot,
cables extending between the lateral feet of successive seats of the first row and of the second row,
the first baseboards, each first baseboard extending between the lateral feet of two of the seats in each first row and covering and carrying the cables, and
second baseboards, each second baseboard extending between the lateral feet of two of the seats in each second row and covering and supporting the cables.

BACKGROUND OF THE INVENTION

In vehicles intended for the passenger transport, it is common to arrange the seats with variable separation distances between the seats from one row of seats to the other. In particular, such is the case when the vehicle comprises a first class and a second class, with the seats of the first class being more spaced apart from each other, in order to provide greater comfort.

Vehicle seats are generally connected to the electrical and/or electronic network of the vehicle, in order to provide passengers with comfort and interactivity functions during their journey.

For ergonomics and practicality reasons, the seats are connected in series by cables running along the walls of the vehicle, baseboards covering the cables between the seat feet, so as to protect the seat feet and to mask same, in order to improve the aesthetics of the compartment.

However, it is necessary to use a plurality of models of baseboards and seat feet, different from each other, in order to adapt the layout of the feet and of baseboards to the variable spacing between the seats.

Such vehicle layout requires the design and manufacture of a plurality of variants of each of the parts, which generates additional costs and additional preparation time.

SUMMARY OF THE INVENTION

A goal of the invention is thus to provide a vehicle allowing the spacing between the seats to vary from one row to another, without significantly increasing the cost and the design time required.

To this end, the subject matter of the invention relates to a vehicle of the aforementioned type, wherein the first baseboards and the second baseboards have identical lengths, measured along a direction of extent of the first row and of the second row, respectively, each first baseboard and/or each second baseboard comprises, on at least one end, a portion covered by one of the lateral feet of the seats between which the first baseboard and/or the second baseboard is arranged.

Such a vehicle makes it possible to use one variant of foot and/or of baseboard variant for each row, despite different separation distances between the seats.

According to particular embodiments, the vehicle according to the invention has one or a plurality of the following features, taken individually or according to all technically possible combinations:

The cables, the first baseboards and the second baseboards extending along the first wall and the second wall, respectively, with each covered portion preferentially extending between the first wall, the second wall, respectively, and the lateral foot.

Each first baseboard and each second baseboard extending in a plane substantially parallel to main directions of elongation of the lateral feet.

Each lateral foot comprising a support part of a seat cushion and a cover at least partially covering the support part, each covered part of the baseboards being covered by the cover of a lateral foot and extending away from the support part of said lateral foot.

Each lateral foot including, for each covered portion, a seal extending between the cover and the covered part.

The lateral feet of the first-row seats and the lateral feet of the second row seats being identical to each other.

Each covered portion of each first baseboard having a length strictly shorter than 5% of the length of the first baseboard and each covered portion of each second baseboard having a length strictly longer than 5% of the length of the second baseboard.

Each baseboard having a length comprised between 500 mm and 800 mm, preferentially between 600 mm and 650 mm.

Each first baseboard and each second baseboard having an upper edge extending between the first wall, the second wall, respectively, and a facing member of the wall.

The cables being entirely supported by the first baseboards and the second baseboards.

BRIEF DESCRIPTION OF THE DRAWINGS

The invention will be better understood upon reading the following description, given only as an example and making reference to the enclosed drawings, amongst which.

DETAILED DESCRIPTION OF THE PREFERRED EMBODIMENTS

Figure 1:
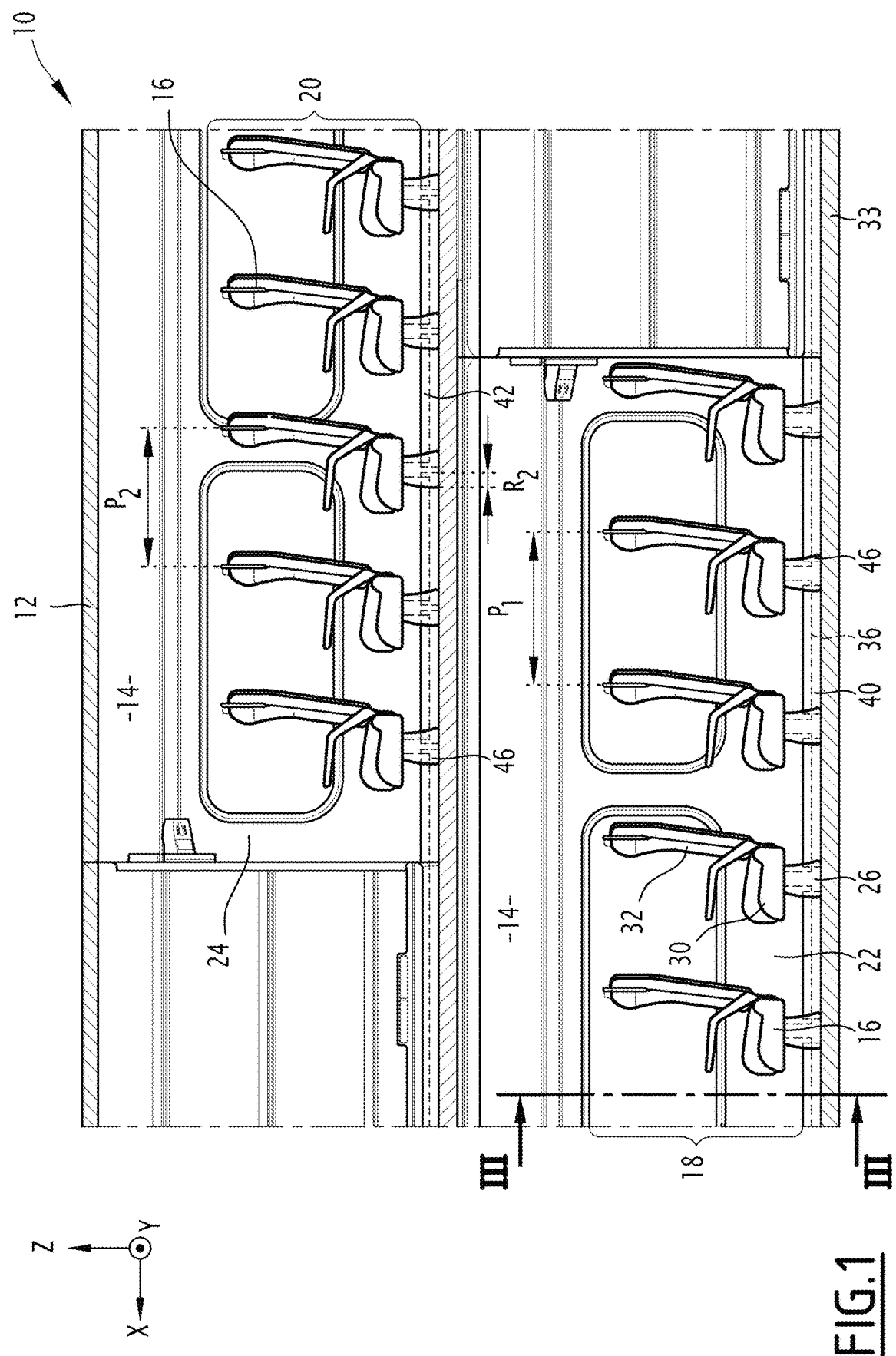
FIG. 1 is a schematic view, in lateral section, of the vehicle according to the invention.

A vehicle 10 is shown in FIG. 1. The vehicle 10 is a vehicle for receiving and transporting passengers. The vehicle 10 is a e.g. a railway vehicle, such as a high-speed train, a subway, or a tram. In a variant, the vehicle 10 is a road vehicle such as a bus.

The following description is given with reference to a longitudinal direction X, a transverse direction Y and a direction of elevation Z, shown in the figures. The longitudinal direction X extends along the direction of forward motion of the vehicle in normal operation. The direction of elevation Z is orthogonal to the longitudinal direction X and corresponds to the height of the vehicle. The transverse direction is perpendicular to the longitudinal direction and to the direction of elevation Z.

The terms "substantially parallel", "substantially along" and "substantially perpendicular" mean respectively "parallel", "along" and "perpendicular" with a margin of angular error less than or equal to 10°, preferentially less than 5°.

The term "substantially equal" means "equal" with a margin of error less than or equal to 10% of the nominal value, preferentially less than or equal to 5%.

The vehicle 10 comprises walls 12 delimiting at least one compartment 14 for passengers. In the example shown, the vehicle 10 comprises two compartments, superimposed along the direction of elevation Z.

The vehicle 10 further comprises seats 16 distributed in rows in each compartment 14. In the example shown, the vehicle 10 comprises a first row 18 of seats 16 extending in the lower compartment 14 with to the direction of elevation Z and a second row 20 of seats 16 extending in the upper compartment 14 with respect to the direction of elevation Z.

The term "row of seats" refers to a plurality of seats 16 aligned, e.g. along the longitudinal direction X.

The seats 16 of the same row 18, 20 are e.g. oriented so as to face the same direction. In a variant, some of the seats 16 of the row 18, 20 are oriented in the opposite direction, so as to face another seat 16.

The first row 18 extends along a first lateral wall 22 of the lower compartment 14 and the second row 20 extends along a second lateral wall 24 of the upper compartment 14. The term "lateral wall" means that the first 22 and second 24 walls delimit the first and second compartments 14, respectively, along the transverse direction Y.

In a variant, the first wall 22 and the second wall 24 are two opposite walls delimiting laterally the same compartment 14.

According to another variant, the first wall 22 and the second wall 24 are two parts of the same lateral wall aligned successively along the longitudinal direction X.

According to another variant, the first wall 22 and the second wall 24 are located in two different cars of the vehicle 10.

The seats 16 of the first row 18 are separated by a first constant separation distance $P_1$, and the seats 16 of the second row 20 are separated by a second constant separation distance $P_2$, different from the first separation distance $P_1$, and in particular strictly less than the first separation distance $P_1$.

For example, the first separation distance $P_1$ is comprised between 930 mm and 980 mm, in particular substantially equal to 950 mm, and the second separation distance $P_2$ is comprised between 880 mm and 930 mm, in particular substantially equal to 905 mm.

The separation distance $P_1$, $P_2$ is the distance separating two adjacent seats 16 of a row 18, 20, as measured along the direction along which extends the row 18, 20.

In particular, the separation distance $P_1$, $P_2$ separating two seats 16 of a row 18, is measured along the direction of elongation of the row 18, 20, e.g. the longitudinal direction X, between two identical points of the two seats 16. In the example shown, the separation distance $P_1$, $P_2$ is measured between the tops of the seats 16, i.e. the highest point of the seat 16 along the direction of elevation Z.

For example, the first row 18 of seats 16 is a row of seats of the "first class" type, while the second row 20 of seats 16 is a row of seats of the "second class" type.

Each seat 16 is e.g. Intended for accommodating two passengers.

In a variant, at least a part of the seats 16 is intended for accommodating one passenger or three passengers or more passengers.

Each seat 16 comprises a central foot 26 and a lateral foot 28, supporting a seat pan 30 and a backrest 32.

The central foot 26 and the lateral foot 28 have elongated shapes mainly along a direction of elongation substantially parallel to the direction of elevation Z, between a floor 33 of the compartment 14 and the seat pan 30.

Figure 3:
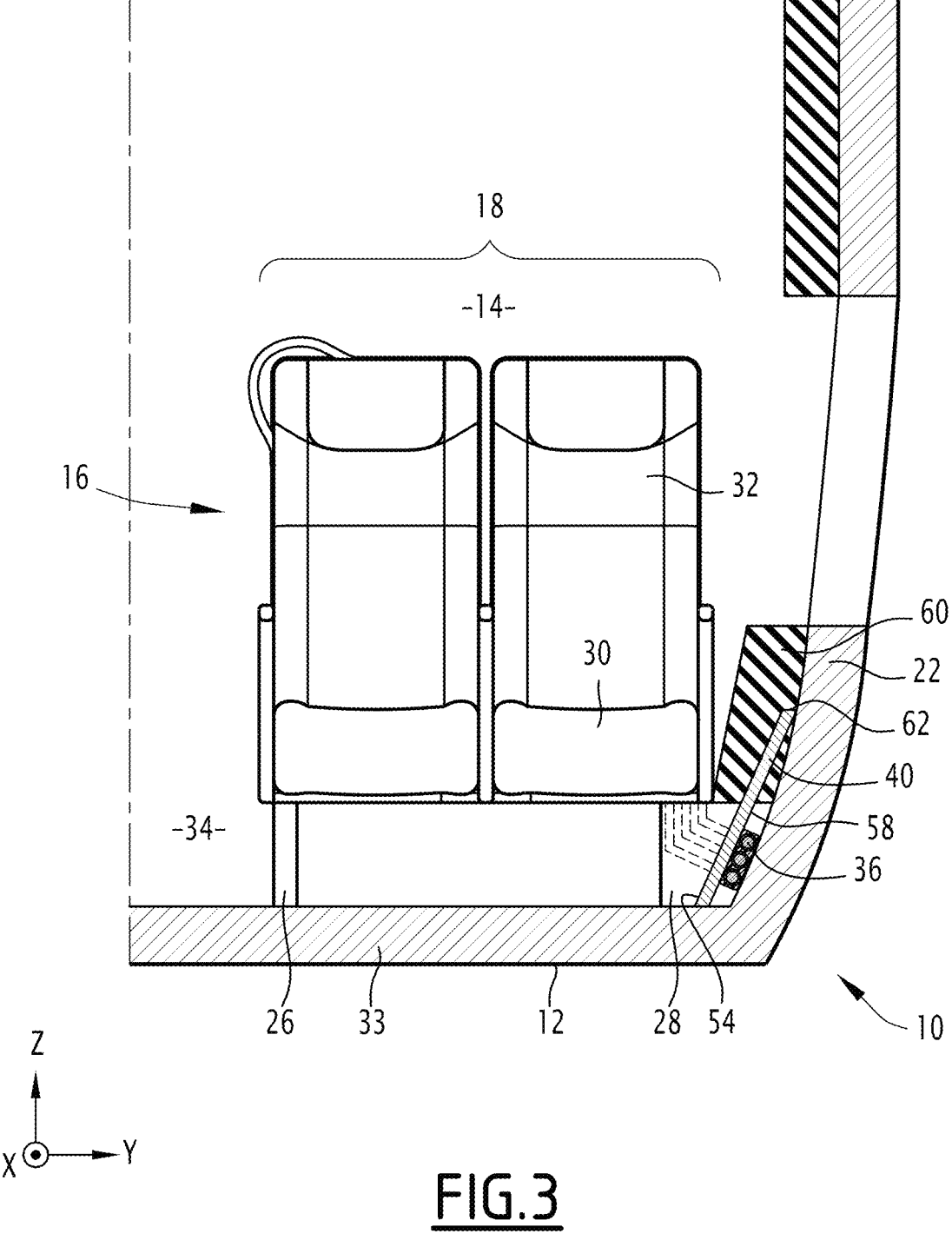
FIG. 3 is a transverse section view of the baseboards shown in FIG. 2.

As shown in FIG. 3, the central foot 26 and the lateral foot 28 are attached to two lateral edges of the seat pan 30, spaced apart from each other along the transverse direction Y.

The central foot 26 is situated in the vicinity of a passenger lane 34 in the compartment 14, whereas the lateral foot 28 extends in the vicinity of the first wall 22 or the second wall 24.

Advantageously, the lateral feet 28 of the seats 16 of the first row 18 and of the second row are identical to each other. It is in this way possible to simplify the design of the seats 16 of the vehicle 10.

The seats 16 comprise electrical and/or electronic modules (not shown), requiring an electrical power supply and a data transfer system.

The electrical and/or electronic modules comprise e.g. charging sockets for electronic equipment, ports for access to a communication network, sensors for detecting the occupancy of the seat 16, devices for notifying or calling the vehicle crew, one or a plurality of screens, or a control device for moving the seat 16 between a plurality of configurations, e.g. by modifying the inclination of the backrest 32.

To this end, the vehicle 10 comprises cables 36, e.g. electrical cables and/or data buses, extending between the lateral feet of the successive seats 16, so as to connect the seats 16 "in series" in order to use the electrical power supply and the data speed.

The cables 36 extend along the first wall 22 for the first row and of the second wall 24 for the second row, from one seat 16 to the other, and rise through the lateral feet 28 of the seats 16 to reach and be connected to the electrical and/or electronic modules.

The vehicle 10 further comprises first baseboards 40 and second baseboards 42, each first baseboard 40 extending between two of the seats 16 of the first row 18 and each second baseboard 42 extending between two of the seats 16 of the second row 20, over the cables 36.

Thereby, the cables 36 extending in each space separating two successive seats 16 of a row 18, 20 are supported by one of the baseboards 40, 42.

The first baseboards 40 and the second baseboards 42 are arranged so as to fully support and cover the cables 36, in order to protect and to mask the cables, for improving the aesthetics of the compartment 14, as shown in FIG. 3.

The expression "support the cables 36" means that each cable 36 is fully supported by the first baseboard 40 or by the second baseboard 42 and is not directly attached to the first wall 22 or to the second wall 24.

The first baseboards 40 and the second baseboards 42 are facing and protecting plates for the cables 36, e.g. metal plates with a substantially rectangular shape.

The first baseboards 40 and the second baseboards 42 extend along the first wall 20 and the second wall 22, respectively. Each baseboard 40, 42 is designed so as to substantially match the shape of the wall 22, 24 against which the baseboard is arranged, while providing a space for the passage of the cables 36.

In particular, the baseboards 40, 42 extend in respective planes which are substantially parallel to the direction of elevation Z, i.e. parallel to the main direction of elongation of the lateral foot 28.

In a variant, the first baseboards 40 and the second baseboards 42 extend against the floor 33 of the compartment 14.

Each baseboard 40, 42 has two ends 44 at a distance from each other along the direction of extent of the first row 18 and of the second row 20, respectively, e.g. the longitudinal direction X.

Figure 2:
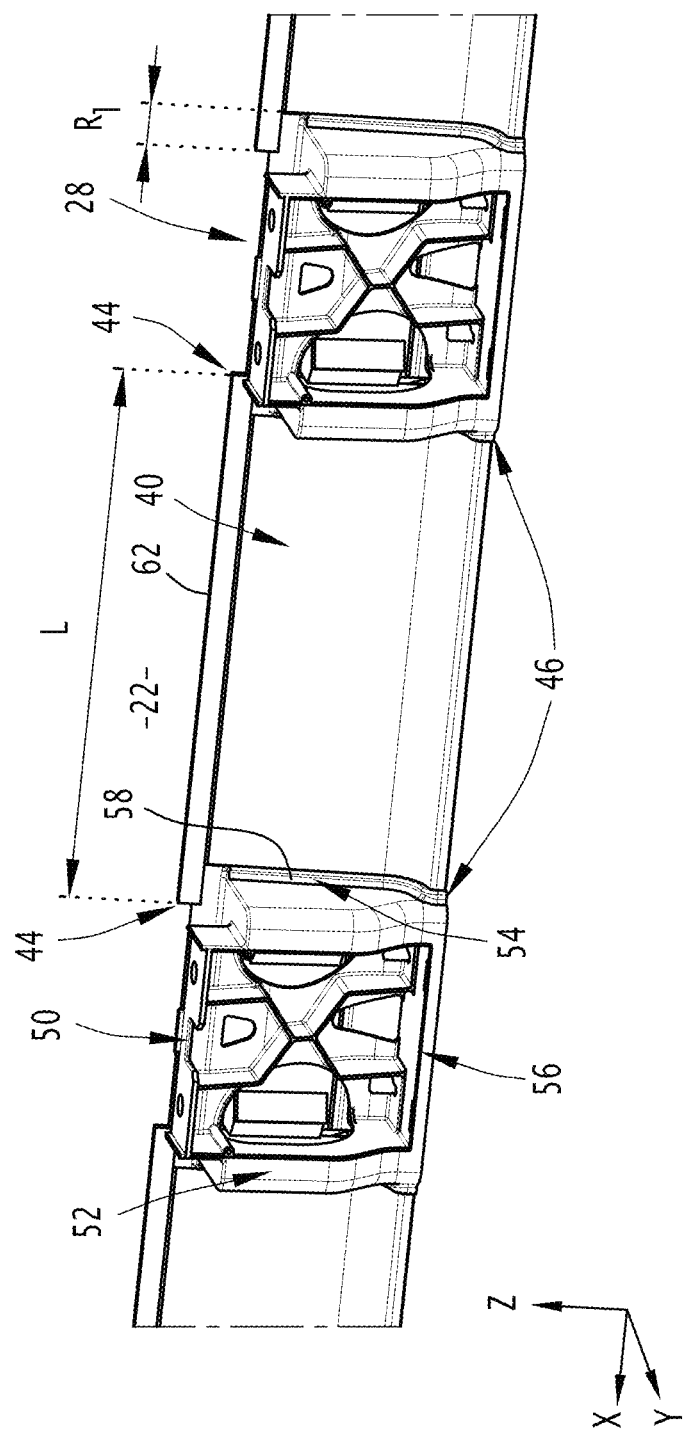
FIG. 2 is a detail of the seat legs and of the baseboards of the vehicle shown in FIG. 1.

The first baseboards 40 and the second baseboards 42 have identical lengths L, measured between the ends 44 of the baseboard 40, 42, along the direction of extent of the first row 18 and of the second row 20, respectively, e.g. the longitudinal direction X, as shown in FIG. 2.

For example, each first baseboard 40 and each second baseboard 42 has a length L comprised between 600 mm and 650 mm.

As shown in FIGS. 1 and 2, the first baseboards 40 and the second baseboards 42 extend between the lateral feet 28 of the seats 16. In addition, each first baseboard 40 and each second baseboard 42 comprises, on at least one end, a portion covered 46 by one of the lateral feet 28 of the seats 16 between which the baseboard is arranged.

Each covered portion 46 is a part of the baseboard 40, 42 next to the end 44, which extends e.g. between the lateral foot 28 and the first wall 22 or second wall 24, with respect to the transverse direction Y, as shown in FIG. 3.

The covered portion 44 of the first baseboards 40 and of the second baseboards 42 compensates for the difference between the first separation distance P and the second separation distance $P_2$ while using baseboards 40, 42 of the same length L.

In particular, each covered portion 44 of each first baseboard 40 has a length $R_1$ strictly less than 5% of the length L of the first baseboard 40 and each covered portion 44 of each second baseboard 42 has a length $R_2$ strictly greater than 5% of the length L of the second baseboard 42. The lengths $R_1$, $R_2$ of the covered portions 44 are measured along the longitudinal direction X, from the end of the baseboard 40, 42.

For example, each first baseboard 40 and each second baseboard 42 has a length L substantially equal to 615 mm and comprises a covered portion 46 at each of the ends 44 thereof. Each covered portion 46 of each first baseboard 40 then has e.g. a length $R_1$ substantially shorter than 30 mm, in particular shorter than 20 mm, and each covered portion 46 of each second baseboard 42 has, e.g., a length $R_2$ substantially longer than 35 mm, especially longer than 40 mm.

In a variant, the covered part 46 extends between the lateral foot 28 and the floor 33.

Advantageously, as shown in FIG. 2, each lateral foot 28 comprises a support part 50 for supporting the seat pan 30 and a cover 52 covering, at least longitudinally, the support part 50. Each covered portion 46 of the baseboards 40, 42 is covered by the cover 52 and extends away from the support part 50.

The support part 50 is the part of the lateral foot 28 mechanically supporting the seat pan 30, arranged centrally with respect to the cover 52.

The support part 50 extends e.g. at a distance, as measured in the longitudinal direction X, greater than 10 mm from the end 44 of each baseboard 40, 42, so as to prevent any damage to the baseboards 40, 42 and from the lateral foot 28 during assembly of the seat 16.

The cover 52 surrounds the support part 50, at least opposite longitudinal faces of the support part 50 orthogonal to the longitudinal direction X. The cover 52 protects the support part 50 and the end 44 of the baseboard 40, 42 from the outside.

The cover 52 extends to the vicinity against the baseboard 40, 42 along the transverse direction Y, on the side of the baseboard 40, 42 opposite the wall 22, 24. In particular, the cap 52 defines an edge 54 which extends to the vicinity of the baseboard 40, 42, or even in contact against the baseboard 40, 42.

The cover 52 further defines a central opening 56 which opens opposite the support part 50 and allows the lateral foot 28 to be attached. This central opening 56 is e.g. closed by a removable cover made of transparent plastic.

Advantageously, each lateral foot 28 comprises, for each covered portion 46, a seal 58 extending between the edge 54 of the cover 52 and the covered part 46 of the baseboard 40, 42.

The seal 58 prevents the infiltration of liquids between the baseboard 40, 42 and the edge 54, so as to prevent corrosion attacks on the lateral foot 28.

The vehicle 10 further comprises facing elements 60 of the first walls 22 and of the second walls 24, which extend along the walls 22, 24 in order to improve the visual appearance thereof. The facing elements 60 are masked in FIG. 2 and are visible in FIG. 3.

Advantageously, an upper edge 62 of each baseboard 40, 42 is arranged between the facing element 60 and the wall 22, 24, so that the baseboard 40, 42 is inserted between the facing element 60 and the wall 22, 24. Such layout prevents the flow of liquids resulting from condensation or accidental spraying behind the baseboards 40, 42, in order to protect the cables 36 and prevent short circuits or corrosion.

The vehicle 10 according to the invention thus makes it possible to use baseboards 40, 42 with identical lengths L for rows 18, 20 of seats 16 with distinct separation distances $P_1$, $P_2$, by taking up the difference in length over one or a plurality of portions 46 covered by the lateral feet 28 of the seats 16. Thereby, the design of the baseboards 40, 42 of the vehicle is facilitated, and it is possible to simply vary the spacing between the seats 16 of the vehicle 10 without having to redesign and produce new baseboards 40, 42. In addition, the assembly and management of stocks of parts are simplified since it is not necessary to take into account a plurality of different types of baseboards.

The vehicle 10 is also more modular, since the change of a row of seats 16 from a first-class configuration to a second-class configuration, or vice versa, does not require any replacement of the baseboards 40, 42. Furthermore the fact that the cables 36 are fully supported by the baseboards 40, 42 prevents the cables to be unclamped and re-clamped during such a change of configuration, a simple displacement of the baseboard 40, 42 being sufficient.

What is claimed is:

1. A vehicle comprising:

at least one first row of seats successively aligned along a first wall of the vehicle, the seats of each first row being separated from each other by a first constant separation distance, at least one second row of seats successively aligned along a second wall of the vehicle, the seats of each second row being separated from each other by a second constant separation distance, the second separation distance being strictly less than the first separation distance, each seat of each first row and each second row having a respective lateral foot, cables extending between the lateral feet of the successive seats of the first row and of the second row, first baseboards, each first baseboard extending between the lateral feet of two of the seats of each first row and covering and supporting the cables, and second baseboards, each second baseboard extending between the lateral feet of two of the seats of each second row and covering and supporting the cables, wherein the first baseboards and the second baseboards have identical lengths, measured along a direction of extent of the first row and of the second row, respectively, each first baseboard and/or each second baseboard comprises, on at least one end, a portion covered by one of the lateral feet of the seats between which the first baseboard and/or the second baseboard is arranged.

2. The vehicle according to claim 1, wherein the cables, the first baseboards and the second baseboards extend along the first wall and the second wall, respectively, each covered portion preferentially extending between the first wall, the second wall, respectively, and the lateral foot.

3. The vehicle according to claim 1, wherein each first baseboard and each second baseboard extends in a plane substantially parallel to main directions of elongation of the lateral feet.

4. The vehicle according to claim 1, wherein each lateral foot comprises a support part of a seat pan of the seat and a cover covering at least partially the support part, each covered portion of the baseboards being covered by the cover of a lateral foot and extending away from the support part of said lateral foot.

5. The vehicle according to claim 4, wherein each lateral foot comprises, for each covered portion, a seal extending between the cover and the covered portion.

6. The vehicle according to claim 1, wherein the lateral feet of the seats of the first row and the lateral feet of the seats of the second row are identical to each other.

7. The vehicle according to claim 1, wherein each covered portion of each first baseboard has a length strictly shorter than 5% of the length of the first baseboard and each covered portion of each second baseboard has a length strictly longer than 5% of the length of the second baseboard.

8. The vehicle according to claim 1, wherein each baseboard has a length comprised between 500 mm and 800 mm, preferentially between 600 mm and 650 mm.

9. The vehicle according to claim 1, wherein each first baseboard and each second baseboard has an upper edge extending between the first wall, the second wall, respectively, and a facing member of the wall.

10. The vehicle according to claim 1, wherein the cables are fully supported by the first baseboards and the second baseboards.

* * * * *